United States Patent
Leminoux et al.

(10) Patent No.: US 7,536,272 B2
(45) Date of Patent: May 19, 2009

(54) METHOD AND DEVICE FOR ESTIMATING THE TOTAL MASS OF A MOTOR VEHICLE

(75) Inventors: Gerald Leminoux, Longnes (FR); Eric Plevin, Rueil Malmaison (FR); Richard Pothin, Vaucresson (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 10/563,158

(22) PCT Filed: Jul. 2, 2004

(86) PCT No.: PCT/FR2004/001719
§ 371 (c)(1),
(2), (4) Date: Jun. 13, 2006

(87) PCT Pub. No.: WO2005/012848
PCT Pub. Date: Feb. 10, 2005

(65) Prior Publication Data
US 2007/0038357 A1 Feb. 15, 2007

(30) Foreign Application Priority Data
Jul. 4, 2003 (FR) .................................. 03 08224

(51) Int. Cl.
*G01G 9/00* (2006.01)
*G01C 9/00* (2006.01)

(52) U.S. Cl. .................. 702/173; 702/75; 702/154; 702/176; 701/124

(58) Field of Classification Search ......... 702/142–148, 702/154, 173, 175, 176, 174; 701/124, 37
See application file for complete search history.

(56) References Cited

U.S. PATENT DOCUMENTS

| 5,944,763 | A | * | 8/1999 | Iwasaki | ....................... 701/37 |
| 6,249,735 | B1 | | 6/2001 | Ishiguro et al. | |
| 2004/0167705 | A1 | * | 8/2004 | Lingman et al. | ............. 701/124 |

FOREIGN PATENT DOCUMENTS

WO 03/016837 2/2003

* cited by examiner

*Primary Examiner*—Hal D Wachsman
*Assistant Examiner*—Phuong Huynh
(74) *Attorney, Agent, or Firm*—Oblon, Spivak, McClelland, Maier & Neustadt, P.C.

(57) ABSTRACT

A method for estimating the total mass of a motor vehicle by a recursive least squares algorithm. The method involves a vehicle longitudinal acceleration computing according to a fundamental dynamic equation by analysing errors by an acceleration variation caused by errors including a variation error of the vehicle mass with respect to a predetermined mass, declivity error of a surface on which the vehicle is placed, and model errors. The declivity is delivered by a declivity sensor or by declivity estimation mechanism.

10 Claims, 4 Drawing Sheets

METHOD AND DEVICE FOR ESTIMATING THE TOTAL MASS OF A MOTOR VEHICLE

The present invention relates to a method and device for estimating the total mass of a motor vehicle.

Knowledge of the total mass of a motor vehicle is necessary to effective operation of numerous devices installed on board the vehicle, such as devices for control of braking or for control of an automatic gearbox. In such devices, the use of a nominal mass actually does not permit optimal control of the vehicle.

It is therefore desirable to obtain rapidly a reliable estimate of the vehicle mass, even when the vehicle is traveling on a slope. Devices for evaluating the mass of a motor vehicle exist.

U.S. Pat. No. 6,249,735 describes a method for estimating the state of a vehicle, comprising a step of estimating the mass of the vehicle from the engine torque and the vehicle acceleration during a gear shift. The acceleration is calculated by a discrete approximation of the derivative of the speed and by filtering, which entails problems of noise and influences the precision and robustness of the estimate.

U.S. Pat. No. 6,167,357 calculates the acceleration of the vehicle by integrating its speed, but it does not make any allowance for the inclination of the surface on which the vehicle is traveling.

International Patent WO 03/016837 relates to a method for estimating the mass of a vehicle being driven on a road having a variable gradient. The vehicle speed is measured to generate an input datum for a calculating device, and a variable comprising a longitudinal force acting on the vehicle is measured to generate an input datum for the calculating device.

The methods that do not use the vehicle acceleration are certainly less noisy, but they do not make allowance for the inclination of the surface on which the vehicle is traveling.

The object of the invention is to estimate the total mass of a motor vehicle by using the vehicle acceleration, in order to take into account the inclination of the surface on which the vehicle is traveling, while reducing the problems of noise of parameters measured by sensor or calculated.

The method according to one aspect of the invention makes it possible to estimate the total mass of a motor vehicle. The vehicle mass is estimated by a recursive least-squares algorithm, which comprises a calculation of the longitudinal acceleration of the vehicle on the basis of Newton's Second Law of Motion, by analysis of errors, by means of an acceleration variation due to errors. These errors comprise an error in the vehicle mass, an error in the inclination of the surface on which the vehicle is traveling, and errors of the model, the said inclination being supplied by a slope sensor or by inclination-estimating means.

The method makes it possible to estimate the total mass of the vehicle by taking into account the inclination of the surface on which it is traveling, without taking the derivative of the speed, which makes it possible to improve the precision of the estimate.

In a preferred embodiment, data comprising a reinitialization instruction, the vehicle speed, the rate of rotation of the engine, the torque transmitted by the engine, detection of actuation of the clutch, detection of actuation of the brakes and detection of cornering of the vehicle are processed in order to calculate the longitudinal acceleration of the vehicle, a resultant of the motive, aerodynamic and rolling forces, and an equivalent mass due to inertial forces of transmission.

In an advantageous embodiment, the said processing of the said data is enabled when they remain respectively in predetermined intervals of values that ensure validity of the model.

The total mass of the vehicle is estimated by a recursive least-squares algorithm, and the estimate of the total mass of the vehicle is supervised by providing a predetermined mass such that the said algorithm has not converged, by fixing the estimated mass when a predetermined convergence criterion has been reached.

In a preferred embodiment, a loop of the estimated mass is additionally processed, and the said acceleration variation due to errors comprising an error in the variation of the vehicle mass relative to a reference mass, an error in the inclination of the surface on which the vehicle is traveling, and errors of the model during data processing is calculated. In addition, acceleration that a slope sensor would provide if such were present is estimated, used in the said recursive least-squares algorithm, the said slope-sensor estimate of acceleration using the said acceleration variation due to errors.

In addition, the inclination is estimated on the basis of the said acceleration variation due to errors, and the said recursive least-squares algorithm depends on the said inclination and has two modes, a flat mode when the inclination is situated in a predetermined interval of values corresponding to a plane surface, and a slope mode in the other cases.

In an advantageous embodiment, during data processing, an acceleration that a slope sensor would provide if such were present is estimated by means of the inclination of the surface on which the vehicle is traveling, the said inclination being provided by the inclination-estimating means and the said slope-sensor acceleration being used in the said recursive least-squares algorithm.

In a preferred embodiment, an acceleration provided by a slope sensor being used in the said recursive least-squares algorithm is processed.

In an advantageous embodiment, the inclination of the surface on which the vehicle is traveling is calculated from the said acceleration provided by the said slope sensor and from the said calculation of longitudinal acceleration of the vehicle. The said recursive least-squares algorithm depends on the said inclination and has two modes, a flat mode when the inclination is situated in a predetermined interval of values corresponding to a plane surface, and a slope mode in the other cases.

According to one aspect of the invention, there is also proposed a device for estimating the total mass of a motor vehicle, comprising wheel-speed sensors, an engine-torque sensor, a rate of rotation of the engine sensor, a clutch-pedal position sensor, a brake-pedal position sensor, means for detecting cornering of the vehicle, and an electronic control unit to which the said sensors are connected. The electronic control unit contains a reinitialization means and means for estimating the total mass of the vehicle by a recursive least-squares algorithm, comprising a calculation of the longitudinal acceleration of the vehicle on the basis of Newton's Second Law of Motion, by analysis of errors. The analysis of errors is performed by means of an acceleration variation due to errors comprising an error in variation of the mass of the vehicle relative to a reference mass, an error in the inclination of the surface on which the vehicle is traveling, and errors of the model. The electronic control unit additionally contains means for processing of data transmitted by the said sensors, means for enabling the said processing of the said data when they remain respectively in predetermined intervals of values that ensure validity of the model, and supervising means for providing a default mass as long as the said algorithm has not converged, by fixing the estimated mass when a predetermined convergence criterion has been reached.

In a preferred embodiment, the device additionally contains a slope sensor capable of transmitting a longitudinal acceleration of the vehicle to the processing means.

Other objectives, characteristics and advantages of the invention will become apparent upon reading the description hereinafter, provided solely by way of example in no way limitative, with reference to the attached drawings, wherein.

Figure 1:
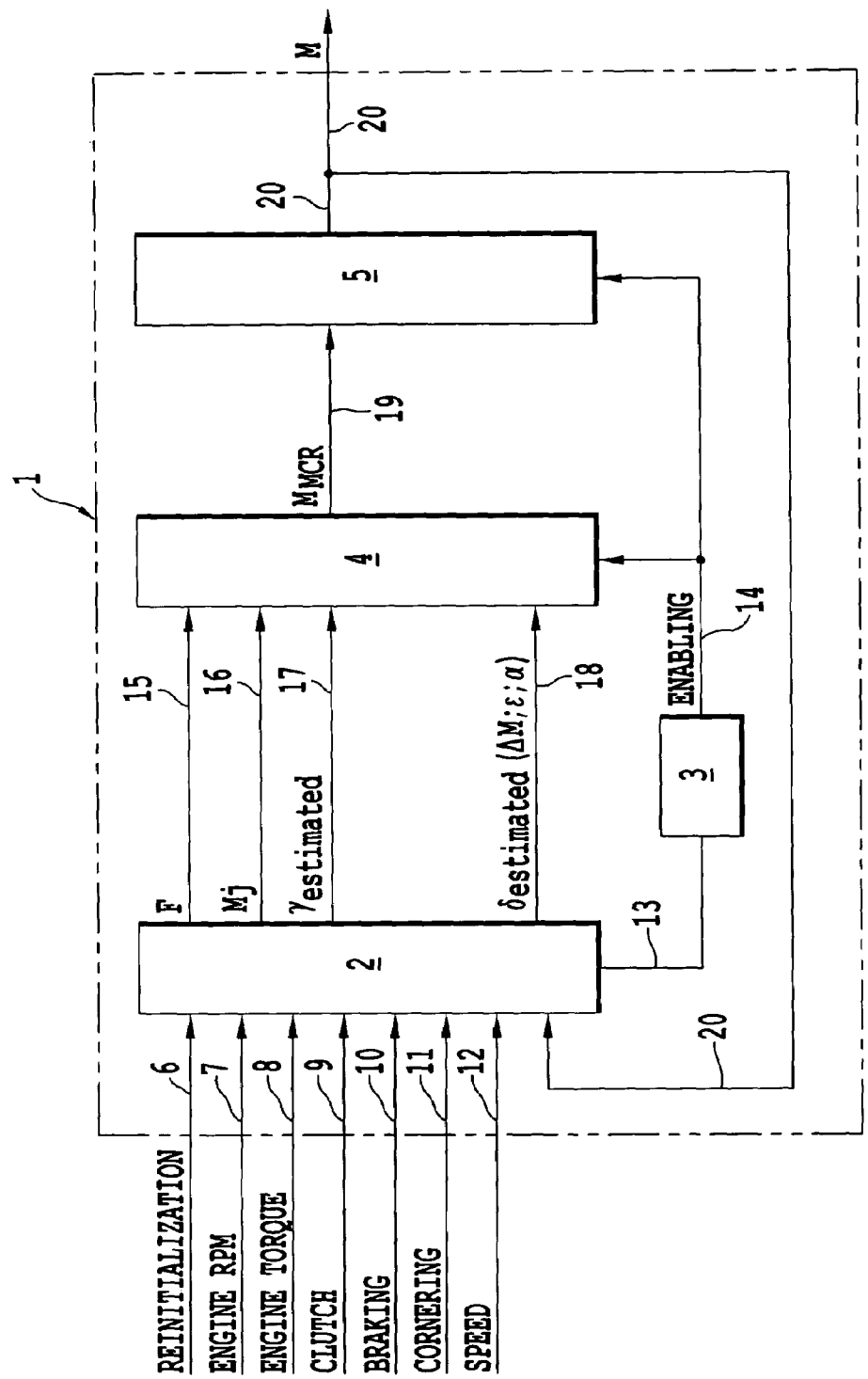
FIG. 1 illustrates the estimation of the total mass according to one aspect of the invention.

FIG. 1 schematically illustrates a first device 1 for estimating the total mass of a motor vehicle, comprising a data-processing block 2, a block 3 for enabling operation of device 1, a block 4 for estimating the mass by a recursive least-squares algorithm and a supervising block 5.

At its input, processing block 2 receives data comprising information on reinitialization via connection 6, the rate of rotation of the engine via a connection 7, the torque delivered by the engine via a connection 8, information on the state of actuation of the clutch via a connection 9, information on braking demanded by the operator via a connection 10, information on cornering of the vehicle via a connection 11 and the vehicle speed via a connection 12.

Blocks 2 and 3 communicate via a connection 13, and enabling block 3 communicates with blocks 4 and 5 via a connection 14.

Block 2 calculates a resultant F of the motive, aerodynamic and rolling forces, an equivalent mass $M_j$ due to the inertial forces of transmission, and an acceleration $\gamma_{estimated}$ of the vehicle, and transmits them to estimating block 4 via connections 15, 16 and 17 respectively. Block 2 additionally calculates an acceleration variation $\delta_{estimated}$ ($\Delta M$, $\epsilon$, $\alpha$) due to parameters comprising a variation $\Delta M$ of the mass of the vehicle relative to a reference mass, errors $\epsilon$ of the model and the inclination $\alpha$ of the surface on which the vehicle is traveling, and transmits it to block 4 via a connection 18. The inclination is provided by inclination-estimating means, for example in the form of a slope sensor, or by equivalent inclination-estimating means.

Using a recursive least-squares algorithm, block 4 estimates a mass $M_{MCR}$ of the vehicle and transmits it to supervising block 5 via a connection 19. The supervising block then processes this input and delivers at the output the estimated total mass M via a connection 20, which is looped to the input of processing block 2, for calculation of the said acceleration variation $\delta_{estimated}$ ($\Delta M$, $\epsilon$, $\alpha$).

The reinitialization information can originate, for example, from opening of a door, which is often synonymous with a change in the number of passengers, or from loading of objects, or else from unloading of objects. In these cases, the mass changes and the estimation of the vehicle mass must be reinitialized.

Block 2 calculates the resultant F via the following relations:

$$\begin{cases} F = F_{engine} - F_{aero} - F_{rolling} \\ F_{aero} + F_{rolling} = \theta_1 + \theta_2 \cdot V^2 \\ F_{engine} = \dfrac{r_{box}\left(C_{engine} = J_{trans}\dfrac{d\omega_{engine}}{dt}\right)}{R_{wheel}} \\ r_{box} = \dfrac{V}{R_{wheel}\omega_{engine}r_{axle}} \end{cases}$$

where:

F is the resultant of the motive forces $F_{engine}$, aerodynamic forces $F_{aero}$ and rolling forces $F_{rolling}$ in N;

$\theta_1$ and $\theta_2$ are predetermined parameters that depend on the vehicle and that make it possible to estimate $F_{aero}+F_{rolling}$ in N and in kg/m respectively;

$r_{box}$ is the ratio, for an engaged gear, of the rate of rotation of an output shaft and the rate of rotation of an input shaft of a clutch of the vehicle;

$C_{engine}$ is the engine torque in Nm;

$R_{wheel}$ is the radius of the vehicle wheels in m;

$\omega_{engine}$ represents the rate of rotation of the engine in rad/s;

$J_{trans}$ represents the inertia of the assembly comprising the engine and transmission in kg m²/s, and $r_{axle}$ is the gear-reduction ratio of the axle, nondimensional.

Block 2 additionally calculates an equivalent mass $M_j$ due to the inertial forces of transmission between the engine and the wheels, by means of a predetermined function of the ratio $r_{box}$.

In addition, block 2 calculates the acceleration $\gamma_{estimated}$ and the acceleration variation $\delta_{estimated}$ ($\Delta M$, $\epsilon$, $\alpha$) on which a zero dynamic (derivative relative to zero time) is imposed by means of the following iterative system:

$$\begin{cases} \gamma_{estimated} = \dfrac{F}{M_0} + \delta_{estimated}(\Delta M, \varepsilon, \alpha) = \dfrac{F}{M_0} + \delta(\Delta M, \varepsilon) + g\alpha \\ \gamma_{sensor} = \gamma_{estimated} - g\alpha \end{cases}$$

where $M_0$ is a predetermined reference mass, such as the mass of the unladen vehicle.

There is obtained the following relation:

$\gamma_{estimated} - \delta_{estimated}(\Delta M, \epsilon, \alpha) = \gamma_{sensor} - \delta(\Delta M, \epsilon)$, which makes it possible to construct a signal provided by a slope sensor if such is present or by equivalent inclination-estimating means, to within the term $\delta(\Delta M, \epsilon)$, which represents an acceleration variation due to the variation of the mass of the vehicle, and to within errors of the model. Similarly, it is considered that $\delta_{estimated}(\Delta M, \epsilon, \alpha)$ is an approximation of the acceleration $g\alpha$ due to the inclination, to within the term $\delta(\Delta M, \epsilon)$. This term $\delta(\Delta M, \epsilon)$ will be all the more negligible the more correct are the estimates of mass, of engine braking and of resistant forces, and for these purposes the mass estimate is reinjected at the input of block 2.

Block 4 estimates a mass $M_{MCR}$ of the vehicle by the recursive least-squares algorithm. It can operate in two modes, slope and flat, if the inclination is being estimated, or else solely in slope mode, if the inclination is not being estimated.

By the said algorithm the equation $y = M_{MCR} \cdot r$ is solved with $r = \gamma_{sensor}$, when a single slope mode is used.

It is also possible to use two estimation modes, comprising a flat mode and a slope mode, chosen according to the estimated value of the inclination. If the estimated inclination is within a predetermined interval defining the flat mode, then the flat mode defined by $$r = \frac{dV}{dt} = \gamma_{estimated}$$

will be used, where V is the vehicle speed, otherwise the slope mode defined by $r=\gamma_{sensor}$ will be used.

Figure 2:
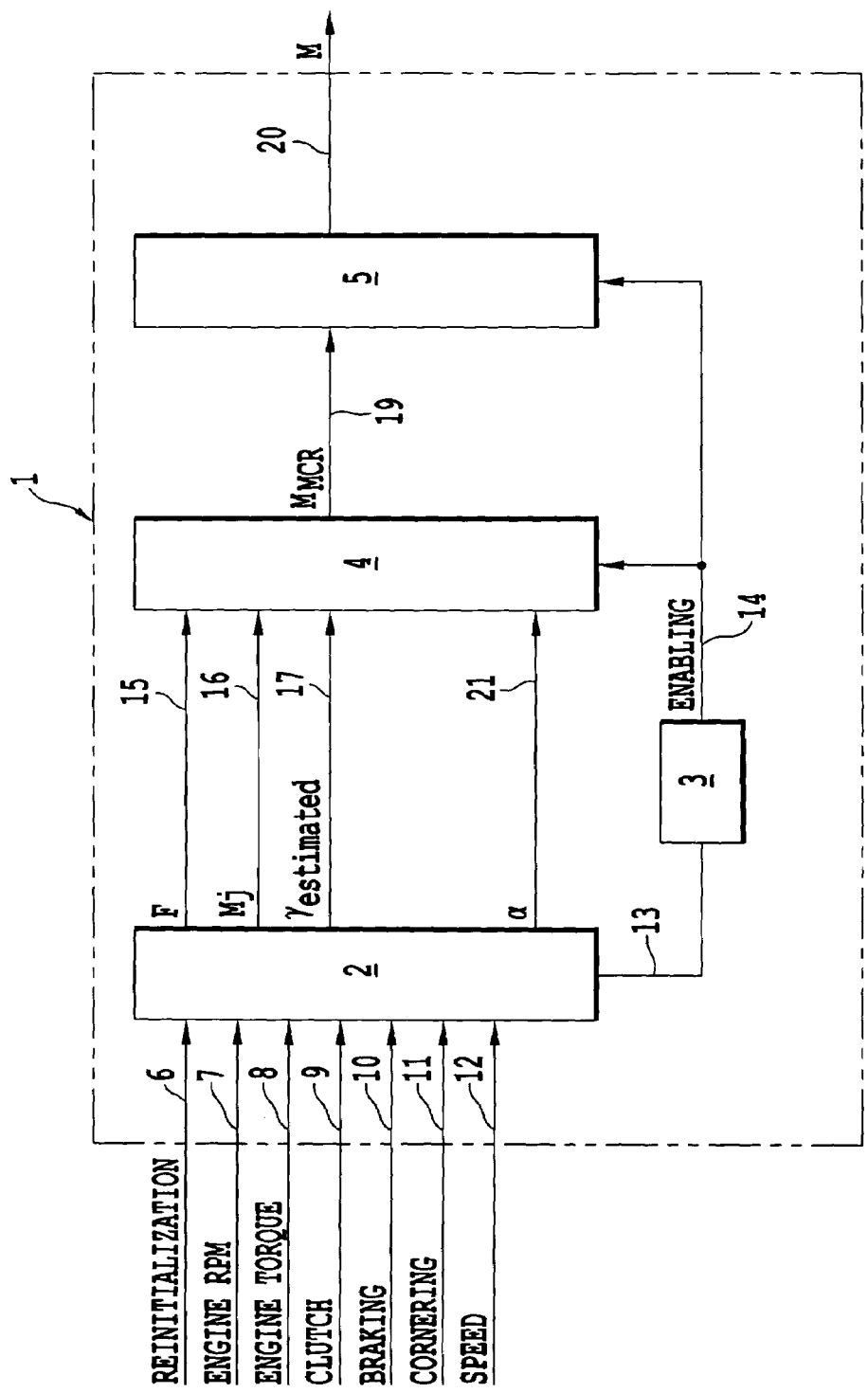
FIG. 2 illustrates the estimation of the total mass according to one aspect of the invention, with an estimation of inclination.

FIG. 2 schematically represents a second device 1 for estimating the total mass of a motor vehicle. The final mass provided by block 4 is not redirected to the input of block 2. Block 2 does not transmit the acceleration variation $\delta_{estimated}$ ($\Delta M$, $\epsilon$, $\alpha$) to block 4, but transmits a value of the inclination $\alpha$ of the surface on which the vehicle is traveling via a connection 21. This inclination is provided, for example, by a slope sensor or is estimated by block 2 by means of another inclination-estimating device.

Block 2 estimates the acceleration 7 estimated of the vehicle by means of the following relations:

$$\begin{cases} \gamma_{estimated} = \frac{dV}{dt} = \frac{1}{M_0}F + \delta_{estimated}(\Delta M, \varepsilon, \alpha) + K_1(V_{sensor} - V_{estimated}) \\ \delta_{estimated}(\Delta M, \varepsilon, \alpha) = 0 + K_2(V_{sensor} - V_{estimated}) \end{cases}$$

where:

$V_{sensor}$ is the vehicle speed provided by a sensor in m/s;
$V_{estimated}$ is the estimated vehicle speed in m/s;
$M_0$ is a reference mass of the vehicle; and
$K_1$ and $K_2$ are predetermined calculation parameters such that convergence takes place in $s^{-1}$ and $s^{-2}$ respectively.

With knowledge of a reliable estimate of the inclination at and of the acceleration $\gamma_{estimated}$, it is possible to construct a signal $\gamma_{sensor}$ provided by a slope sensor if such a sensor is present by means of the following relation:

$$\gamma_{sensor} = \frac{dV}{dt} - g\alpha = \gamma_{estimated} - g\alpha$$

because $g \cdot \sin(\alpha) \cong g\alpha$.

Block 4 estimates a mass $M_{MCR}$ of the vehicle via the recursive least-squares algorithm in the manner described in the foregoing. It can function in two modes, slope and flat, if the inclination is being estimated, or else solely in slope mode, if the inclination is not being estimated.

Figure 3:
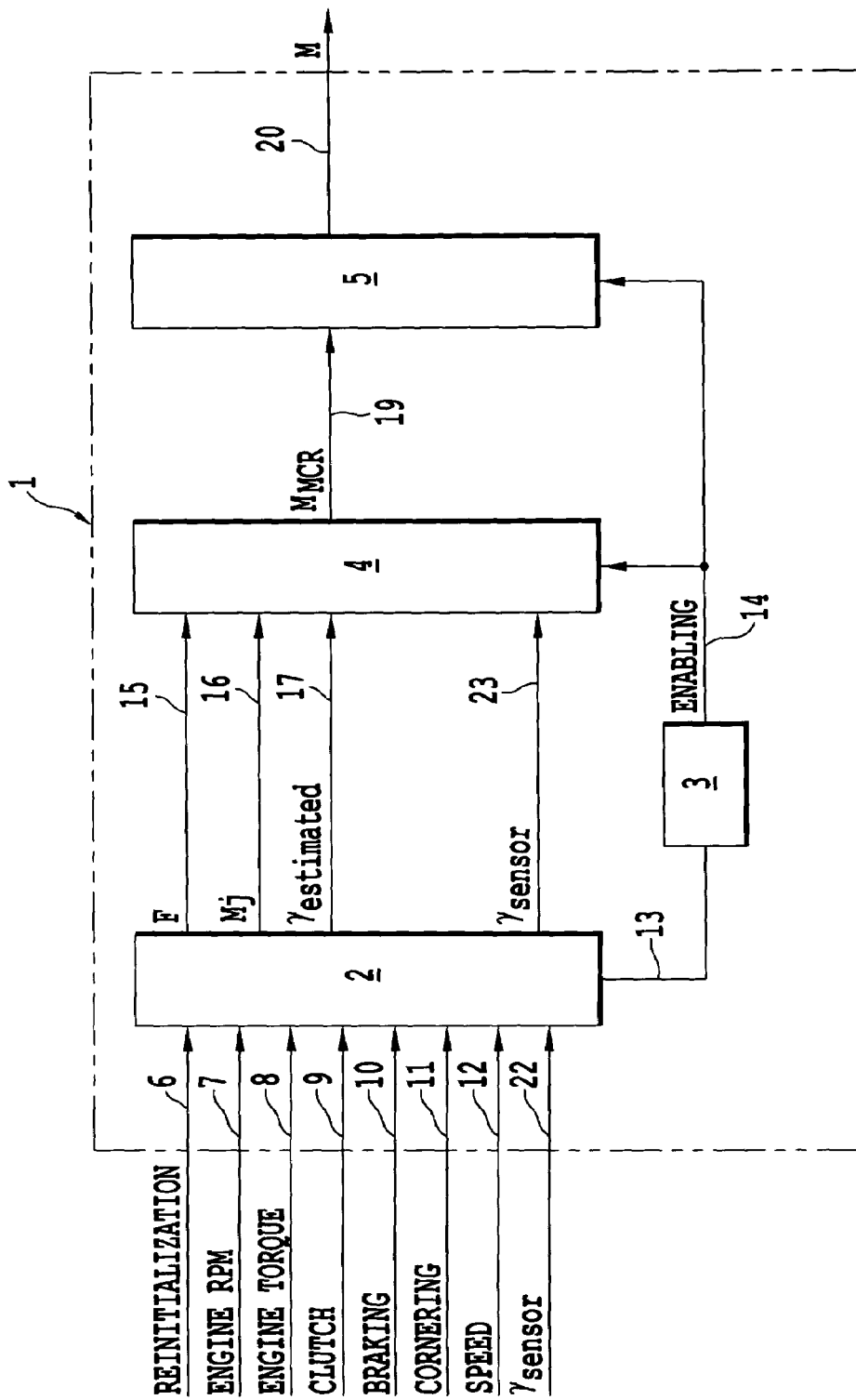
FIG. 3 illustrates the estimation of the total mass according to one aspect of the invention, with an acceleration provided by a slope sensor.

FIG. 3 schematically represents a third device 1 for estimating the total mass of a motor vehicle, containing a slope sensor 23 that provides a vehicle acceleration $\gamma_{sensor}$ to block 2 via a connection 22. Block 2 also transmits the vehicle acceleration $\gamma_{sensor}$ to block 4 via a connection 23. Since block 4 functions solely with a single mode, slope mode in this case, block 2 does not transmit a calculated inclination or acceleration to block 4.

Block 4 estimates a mass $M_{MCR}$ of the vehicle via the recursive least-squares algorithm in the manner described in the foregoing, by means of a single mode, slope.

Figure 4:
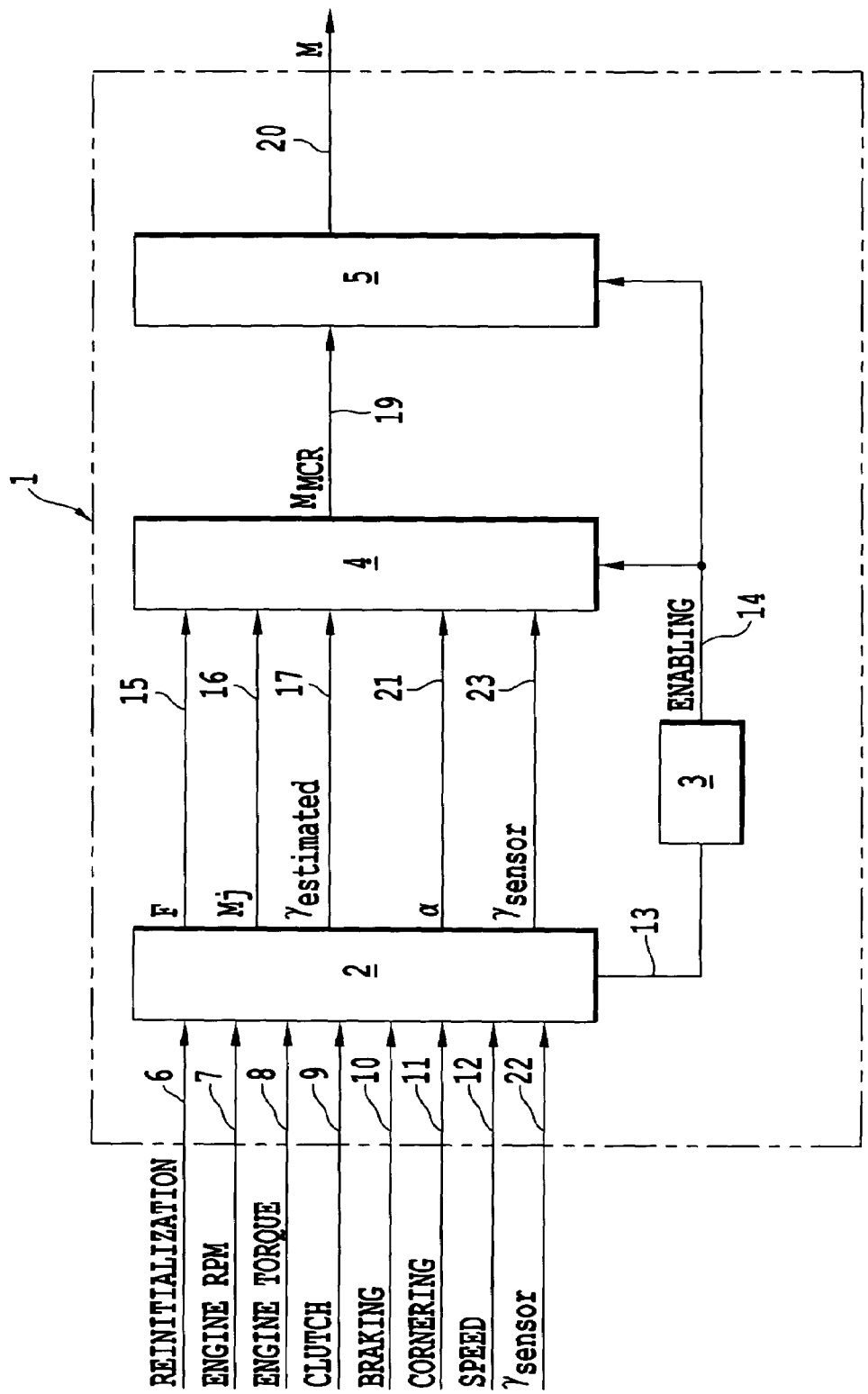
FIG. 4 illustrates the estimation of the total mass according to one aspect of the invention, with an acceleration provided by a slope sensor and an estimation of inclination.

FIG. 4 schematically represents a third device 1 for estimating the total mass of a motor vehicle, containing a slope sensor, wherein block 4 functions in two modes, slope and flat, as described in the foregoing.

The invention makes it possible to obtain a reliable and precise estimate of the total mass of a vehicle, taking into account the inclination on which the vehicle is traveling.

The invention also makes it possible to limit the problems of noise in the measurements provided by sensors or in estimated measurements.

The invention claimed is:

1. A method for estimating total mass of a motor vehicle, comprising:
   calculating, by a recursive least-squares algorithm, longitudinal acceleration of the vehicle based on Newton's Second Law of Motion, by analysis of errors, by an acceleration variation due to errors comprising an error in variation of the vehicle mass relative to a reference mass, an error in inclination of the surface on which the vehicle is traveling, and errors of a model, the inclination being supplied by a slope sensor or by an inclination-estimating mechanism; and
   estimating the inclination of the surface on which the motor vehicle is traveling based on the acceleration variation due to errors, the recursive least-squares algorithm depends on the inclination and has at least two modes, a flat mode when the inclination is within a predetermined interval of values corresponding to a plane surface, and a slope mode when the inclination is not within the predetermined interval of values corresponding to the plane surface.

2. A method according to claim 1, wherein:
   data comprising a reinitialization instruction, vehicle speed, rate of rotation of an engine, torque transmitted by the engine, detection of actuation of a clutch, detection of actuation of brakes, and detection of cornering of the vehicle are processed to calculate the longitudinal acceleration of the vehicle, a resultant of motive forces, aerodynamic forces and rolling forces, and an equivalent mass due to inertial forces of transmission.

3. A method according to claim 2, wherein:
   processing of the data is enabled when the data remains respectively in predetermined intervals of values that ensure validity of the model;
   the total mass of the vehicle is estimated by a recursive least-squares algorithm;
   an estimate of the total mass of the vehicle is supervised by providing a predetermined mass such that the recursive least-squares algorithm has not converged, by fixing the estimated mass when a predetermined convergence criterion has been reached.

4. A method according to claim 3, wherein a loop of the estimated mass is additionally processed, and the acceleration variation due to errors comprising the error in the variation of the vehicle mass relative to a reference mass, the error in the inclination of the surface on which the vehicle is traveling, and the errors of the model during data processing is calculated, and an acceleration that a slope sensor would provide if such were present is estimated and used in the recursive least-squares algorithm, the slope-sensor estimate of acceleration using the acceleration variation due to errors.

5. A method according to claim 3, wherein, during the processing of the data, an acceleration that a slope sensor would provide if such were present is additionally estimated by the inclination of the surface on which the vehicle is traveling, the inclination being provided by the inclination-estimating mechanism and the slope-sensor acceleration being used in the recursive least-squares algorithm.

6. A method according to claim 3, wherein an acceleration provided by a slope sensor being used in the recursive least-squares algorithm is additionally processed.

7. A method according to claim 6, wherein the inclination of the surface on which the vehicle is traveling is calculated from the acceleration provided by the slope sensor and from the calculation of longitudinal acceleration of the vehicle, and the recursive least-squares algorithm depends on the inclination and has two modes, a flat mode when the inclination is situated in a predetermined interval of values corresponding to a plane surface, and a slope mode in other cases.

8. A device for estimating total mass of a motor vehicle, comprising:
- a plurality of sensors including:
  - wheel-speed sensors,
  - an engine-torque sensor,
  - a rate of rotation of an engine sensor,
  - a clutch-pedal position sensor configured to detect actuation of a clutch,
  - a brake-pedal position sensor, and
  - means for detecting cornering of the vehicle; and
- an electronic control unit to which the sensors are connected,
- wherein the electronic control unit includes:
  - reinitialization means,
  - means for estimating total mass of the vehicle by a recursive least-squares algorithm, including calculating longitudinal acceleration of the vehicle based on Newton's Second Law of Motion, by analysis of errors, by an acceleration variation due to errors comprising an error in variation of the mass of the vehicle relative to a reference mass, an error in inclination of the surface on which the vehicle is traveling, and errors of a model,
  - means for processing data transmitted by the plurality of sensors,
  - means for enabling the processing of the data when the data remains respectively in predetermined intervals of values that ensure validity of the model, and
  - supervising means for providing a default mass as long as the algorithm has not converged, by fixing the estimated mass when a predetermined convergence criterion has been reached.

9. A device according to claim 8, further comprising a slope sensor configured to transmit a longitudinal acceleration of the vehicle to the means for processing.

10. A method according to claim 2, wherein the reinitialization instruction is processed so that said total mass of said motor vehicle is measured when a door of the motor vehicle is opened.

* * * * *